United States Patent Office 3,062,886
Patented Nov. 6, 1962

3,062,886
PROCESS FOR THE PREPARATION OF DIAMINES
Ervin G. Pritchett, Irving L. Mador, and Louis J. Rekers, Cincinnati, Ohio, assignors to National Distillers and Chemical Corporation, a corporation of Virginia
No Drawing. Filed May 23, 1956, Ser. No. 586,636
3 Claims. (Cl. 260—583)

The present invention relates to a process for preparation of derivatives of conjugated dienes and, more particularly, to the preparation of diamino derivatives of dimers of conjugated dienes. More specifically, the invention relates to a process for production from butadiene of diamino derivatives of dimers of butadiene.

In co-pending application S.N. 514,399, filed June 9, 1955, and now abandoned, a process is disclosed whereby a conjugated diene is subjected to reaction in an aqueous medium in the presence of free amino radicals under conditions to produce a reaction mixture comprising a diamino product corresponding to addition of two amino radicals to two units of the diene. In illustration and by use of butadiene as the conjugated diene, butadiene is reacted in an aqueous medium in the presence of free amino radicals and a suitable solvent under conditions whereby a reaction product is obtained that contains a diamino octadiene which, if desired, can be hydrogenated to the corresponding saturated $C_8$ diamine. Although the process disclosed in the aforesaid application results in formation of desired diamino product, a desideratum is the obtainment of improved yields of the diamine and the primary object of the present invention is to provide an improvement in the process disclosed in the aforesaid application whereby, in unexpected manner, the yield of desired diamine product is markedly increased.

The improved process embodied herein is based on the discovery that, in a process such as disclosed in the copending application, markedly improved yields of the desired diamino derivatives of the dimer of the conjugated diene are obtained by use of a defined amount of solvent relative to the amount of water present in the reaction mixture and, for obtainment of even more markedly improved yields, the reaction is carried out with the aqueous medium in the reaction mixture being of relatively high acidity. Broadly speaking, therefore, the process embodied herein relates to a process such as that described in the co-pending application whereby markedly improved yields of the desired diamino product are obtained by reacting a conjugated diolefin in an aqueous medium in the presence of free amino radicals and a suitable solvent with use of a defined minimum amount of solvent relative to the amount of water present in the system and with obtainment of still higher yields by having the system at relatively high acidity calculated on the amount of water present. The reaction product that results from the process embodied herein is generally in the form of an aqueous phase and a diene phase with the aqueous phase containing the desired diamino product, i.e., diamino unsaturated products that correspond to addition of two amino groups to a dimer of the diene. For recovery of the desired diamine from the aqueous phase, the aqueous phase may be made alkaline and the diamine extracted therefrom with a suitable non-aqueous solvent (e.g., diethyl ether).

For providing free amino radicals in a process as embodied herein, a suitable method involves the use of hydroxyl amines, such as in the form of a water soluble salt, for oxidation-reduction reaction with a suitable reductant metal salt whereby liberation of a free amino radical occurs. For example, a suitable method for providing free amino radicals is the use of a hydroxyl amine salt (e.g., hydroxylamine hydrochloride) and a water-soluble reductant metal such as titanous chloride, stannous chloride, vanadous chloride, and the like, which undergo oxidation-reduction reaction with the hydroxylamine and, as is illustrated by use of a titanous salt, to form a free amino radical as follows:

$$NH_2OH + Ti^{+3} \rightarrow Ti^{+4} + NH_2 \cdot + OH^-$$

Although such a free radical-forming system is suitable for practice of the invention and hence has been utilized for illustrating specific embodiments set forth hereinafter, other methods that form a free amino radical may be employed. Such other methods include photolytic or nuclear radiation induced decomposition of substances as ammonia, hydrazine or hydroxylamine; chemical oxidation of substances such as ammonia; chemical reduction of substances such as nitrite ion; and electrochemical methods such as discharge of amide ion.

With reference to the use of hydroxylamines as the source of the free amino radicals for the process described herein, the hydroxylamine can be used in the form of a water soluble salt thereof. A particularly preferred salt is hydroxylamine hydrochloride but also contemplated for such usage are hydroxylamines in the form of other water soluble salts such as those of nitric acid, suitable organic acids and the like. Alternatively, as a source of substituted amino radicals, mono- or di-substituted hydroxylamines can be employed of the general formula

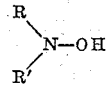

where R and R' are organic radicals, examples of which are N-benzoyl hydroxylamine and N-phenyl hydroxylamine, or where R and R' together form a substituted methylene group of the structure R''=NOH, an example of which is acetone oxime.

The solvent that is employed for carrying out the reaction as embodied herein in an aqueous medium includes organic solvents that are substantially inert under the reaction conditions employed and which increase the mutual solubility of the diene and aqueous components of the reaction mixture. For such a purpose, oxygen-containing organic solvents are particularly suitable with examples thereof being aliphatic alcohols such as ethanol, butanol, tertiary butanol, isopropanol, and others, as well as other oxygen-containing solvents; examples thereof include dioxane, 2-methoxy ethanol, acetic acid and others.

The process embodied herein may be carried out with use of a conjugated diene of which butadiene is particularly well adapted. However, the process may be carried out with use of other conjugated diolefins such as those containing from four to eight carbon atoms and specific examples of which include isoprene, dimethyl butadiene, the pentadienes such as methyl 1,3-pentadienes and the liek. Generally speaking, and for obtaining improved yields of the desired diamino derivatives of a dimer of a conjugated diene, the process embodied herein is carried out in a reaction medium in which the solvent is present in an amount, by volume, of more than about ⅓ part of solvent to 1 part of water and, more preferably, more than about ½ part of solvent per part of water and, still more preferably, from about 1 to about 2½ parts of solvent to 1 part of water. For obtainment of still markedly higher yields of desired diamine, the process is carried out with use of a reaction mixture in which the amount of solvent relative to the water in the system is as is aforedescribed and, additionally, with the reaction mixture being of relatively high acidity and which, expressed as a normality of acid calculated on the water present in the final reaction mixture, should generally be at least 1.5 normal, preferably more than about 4 normal, and still more preferably from about four to about eight normal.

In order to further describe the invention, several examples are set forth hereinafter in which Examples 2 to 10, inclusive, illustrate practice of several embodiments of the invention. Example 1 has been included for purposes of comparison with the remaining examples to illustrate that practice of this invention (Examples 2–10) results in markedly increased yields of the desired diamino product as compared to the yield obtained by carrying out the process in aqueous mediums that do not contain the solvent to water ratio and are less acid than is embodied herein. In the examples, the titanous chloride solution employed was a 20% aqueous solution of titanous chloride and the hydroxylamine solution was an aqueous solution of 35 grams of hydroxylamine hydrochloride in 135 ml. of water.

Example 1

Apparatus: Glass flask fitted with a stirrer, a Dry Ice reflux condenser, a gas inlet tube, and three dropping funnels.

Water (25 mls.) and tertiary butanol (25 mls.) were added to the flask, following which butadiene (1 mol) was passed into and condensed in the flask. A solution of hydroxylamine hydrochloride (0.5 mol, 35 grams in 135 mls. aqueous solution) was added to the reaction mixture through one dropping funnel, and titanous chloride (0.5 mol, 270 mls. of 20% aqueous solution) was added through another of the dropping funnels. The reaction mixture was maintained at about 0° C. and was rapidly stirred for a period of 1½ hours, during which period the hydroxylamine hydrochloride solution and the titanous chloride were separately added dropwise at substantially equivalent stoichiometric rates evidenced by observance of discharge of the blue color of titanous ion upon reaction with the hydroxylamine to form colorless titanic ion. During the reaction period of 1½ hours, additional butadiene was passed into the reacting mixture in an amount approximating 20% of the quantity initially added to the flask. An additional 100 mls. of tertiary butanol were also slowly added during the reaction period while a stream of nitrogen was continuously passed through the reaction vessel to exclude oxygen from the reaction mixture.

At the conclusion of the reaction period, the reaction mixture separated into an aqueous phase and a butadiene phase. The aqueous phase (acidic) was extracted with ether over a period of 24 hours to remove the solvent (tertiary butanol), following which the aqueous phase was made basic with ammonium hydroxide and the titanic precipitate was filtered off. Sodium hydroxide in aqueous solution was then added to the filtrate which was then continuously extracted with ether for 24 hours.

The ether solution prepared as aforedescribed was dried to remove water and the ether removed by evaporation. Glacial acetic acid was then added to the residue and the residue subjected to hydrogenation in the presence of Adam's catalyst under 50 lbs. hydrogen pressure. The acetic acid solution was then neutralized with 40% sodium hydroxide, and excess sodium hydroxide was added until the solution was approximately 2 N in hydroxyl ion concentration. The resulting solution was continuously extracted with ether for 24 hours following which the ether solution was dried over magnesium sulfate. Anhydrous hydrogen chloride was then added to the dried ether solution whereupon a white solid, identified as octanediamine-1,8-dihydrochloride, precipitated and was filtered off. After recrystallization from an ethanol-ether solution, octanediamine-1,8-dihydrochloride having a melting point of 265–278° C. was obtained.

The N-N'-dibenzoyl derivative of the octanediamine thus produced was prepared and, after recrystallization from an ethanol-water solution, had a melting point of 163–166° C. A corresponding dibenzoyl derivative, prepared from a known sample of octanediamine-1,8, gave a melting point of 164–167° C. Moreover, the dibenzoyl derivative from the octanediamine-1,8 prepared as aforedescribed did not show any depression in melting point when admixed with the dibenzoyl derivative prepared from the known octanediamine-1,8.

Analysis of both the dihydrochloride- and the N-N'-dibenzoyl-derivative of the diamine produced as aforedescribed, gave the following values for carbon, hydrogen, chlorine and nitrogen content as compared to theoretical values therefor.

| Derivative | Percent C | Percent H | Percent Cl | Percent N |
|---|---|---|---|---|
| Dihydrochloride: | | | | |
| Found | 44.45 | 10.03 | 32.63 | |
| Theory | 44.28 | 10.21 | 32.65 | |
| Dibenzoyl: | | | | |
| Found | 74.23 | 8.11 | | 8.04 |
| Theory | 74.69 | 8.09 | | 8.04 |

In this example, the yield of diamino derivatives of the dimers of butadiene amounted to 5% based on the hydroxylamine and titanous chloride consumed.

Example 2

A reaction was carried out in a manner similiar to that of Example 1 but in which a total of 295 ml. of t-butanol was used instead of 125 ml. A yield of 14.5% of theory of the $C_8$ unsaturated diamine dihydrochloride was obtained.

Example 3

A reaction was carried out in a manner similar to that of Example 1, but on a ¼ mol scale with use of 175 ml. of dioxane as solvent. A yield of 10% of theory of the $C_8$ unsaturated diamine dihydrochloride was obtained.

Example 4

A reaction was carried out in a manner similar to that of Example 1, but on a ¼ mol scale and with use of 175 ml. of 2-methoxy-ethanol as solvent. A yield of 14.5% of theory of the $C_8$ unsaturated diamine dihydrochloride was obtained.

Example 5

A reaction was carried out in a manner similar to that of Example 1, but on a ¼ mol scale and with use of 175 ml. of isopropanol as the solvent, and in which, during the reaction, concentrated HCl was added. A yield of 42% of theory of the $C_8$ unsaturated diamine dihydrochloride was obtained. Upon washing of the titanic hydroxide precipitate with aqueous caustic, and additional quantity of diamine was obtained resulting in a total yield of 54% of theory.

Example 6

A reaction was carried out in a manner similar to Example 5 except that 350 ml. of isopropanol was used instead of 175 ml. A yield of 53% of theory of the $C_8$ unsaturated diamine dihydrochloride was obtained without washing the titanic hydroxide precipitate.

Example 7

A reaction was carried out in a manner similar to Example 6 but in which ⅛ mol of stannous cloride was used as the reducing agent. A yield of 18% of theory of the $C_8$ unsaturated diamine dihydrochloride was obtained.

Example 8

A reaction was carried out in a manner similar to Example 6 but in which 620 ml. instead of 350 ml. of isopropanol were used. After precipitation of the titanic hydroxide, the alkali slurry was extracted without filtration. A yield of 75% of theory of the unsaturated diamine dihydrochloride was obtained.

Example 9

A reaction was carried out substantially the same as in Example 8 except that, instead of butadiene, one mole of isoprene dissolved in 50 ml. of isopropanol was added dropwise over the reaction period. After extraction of the alkaline slurry, the amine was isolated as the free base, rather than as the hydrochloride. The diamine product (12.6 grams) corresponded to a yield of 60% of theory calculated as dimethyloctadiene diamine. Infra red analysis of the product identified its unsaturated structure and elemental analysis gave the following results:

|  | Percent C | Percent H |
| --- | --- | --- |
| Found | 71.21 | 12.34 |
| Calculated for $C_{10}H_{20}N_2$ | 71.37 | 11.98 |

*Example 10*

Another reaction was carried out in the manner set forth in Example 9, except that methanol was used instead of isopropanol, with similar obtainment of dimethyloctadiene diamine which, upon elemental analysis for nitrogen, gave a value of 11.1% as compared to a calculated value of 11.6% for $C_{10}H_{20}N_2$.

In the following tabulation, additional data pertinent to the foregoing example is set forth. Included therein are the yields of diamine, expressed as a percent of theoretical yield, obtained from each example, the normality (HCl) calculated on the water present in the final aqueous reaction mixture, and the solvent to water ratio present in the mixture.

| Example Number | Total Amounts | | | Normality (HCl) of Final Solution (based on $H_2O$ in Final Solution) | Ratio: Solvent/HCl | Yield of Diamine, percent of theory | |
| --- | --- | --- | --- | --- | --- | --- | --- |
| | $H_2O$ (ml.) | Solvent (ml.) | Mols of HCl | | | Extraction | After Washing |
| 1 | 430 | 125 | 0.81 | 1.88 | 0.29 | 5 | |
| 2 | 410 | 295 | 0.81 | 1.98 | 0.72 | 14.5 | |
| 3 | 225 | 175 | 1.25 | 5.54 | 0.78 | 10 | |
| 4 | 225 | 175 | 1.25 | 5.54 | 0.78 | 14.5 | |
| 5 | 270 | 175 | 1.87 | 6.93 | 0.65 | 42 | 54 |
| 6 | 285 | 350 | 1.98 | 6.95 | 1.23 | 53 | |
| 7 | 278 | 350 | 1.99 | 7.15 | 1.26 | 18 | |
| 8 | 320 | 635 | 2.26 | 7.07 | 1.99 | | 75 |
| 9 | 320 | 635 | 2.26 | 7.07 | 1.99 | 60 | |
| 10 | 320 | 635 | 2.26 | 7.07 | 1.99 | 60 | |

As is apparent from the foregoing examples and data in the tabulation, practice of the process in accordance with the solvent to water ratios and acidity values embodied herein (Examples 2 to 10) markedly increase the yield of the desired diamines as compared to the yield (Example 1) of the diamine that results by use of a reaction medium that contains a lesser amount of solvent to water than is embodied herein. For example, by comparison of the results shown for Example 1 versus Example 2, the yield of diamine increased almost threefold by use of a solvent to water ratio of 0.72:1 in Example 2 as compared to a ratio of 0.29 to 1 in Example 1. The remaining examples clearly illustrate the marked improved yields that are obtained by practice of this invention, including the use of reaction mediums of substantially higher solvent to water ratio and acidity than was employed in Example 1 whereby increased yields up to about 15 times that obtained in Example 1 resulted (Example 8).

In carrying out the reaction embodied herein, the diene reactant is preferably employed in excess so as to favor the dimerization thereof and formation of the desired diamino products. On the other hand, less than a substantial excess of the diene may be employed in which case it is preferable, for minimization of undesired side reactions, to slowly add the free amino radicals or free amino radical precursors and carry out the reaction at a relatively low rate of conversion of the diene. The maximum temperature employed is generally limited by the boiling point of the diene reactant although it is contemplated that carrying out the reaction under pressure is not precluded and in which case a temperature above the normal boiling point of the diene may be used. Hence, and although a temperature of about 0° C. was used for the reaction in the foregoing examples, lower temperatures may be used although temperatures sufficiently low so as to induce freezing of the aqueous components of the reaction mixture should be avoided.

Although the process embodied herein is preferably carried out by concurrent addition to the reaction mixture of the reductant (e.g., titanous chloride) and the source of free $NH_2$. radicals (hydroxylamine) in substantially stoichiometric quantities, the process may be carried out by initial addition of the entire amount of either or both of the oxidation-reduction reactants. However, in preferred embodiment, the invention is carried out as aforesaid by addition of the reductant and the source of free amino radicals at substantially similar rates and, as to addition of either in an excess over the other, it is preferred that the reductant metal ion be in slight excess.

In the production of the unsaturated diamino derivatives of diene dimers as embodied herein the reaction may be carried out using in a ratio of equivalents two of the diene (e.g., butadiene), one of the hydroxylamine and one of the reductant (e.g., titanous chloride). However, the invention is not limited to use of reactants in the aforesaid specific ratio of equivalents as it may be carried out with use of somewhat different proportional amounts of reactants and, for example, the diene may be used in amounts less than or greater than those aforesaid.

The diamino products produced by practice of this invention possess utility for many purposes and, particularly, are suitable upon hydrogenation to provide saturated, relatively high molecular weight aliphatic amines that are useful for reaction with dibasic acids, such as sebacic acid, adipic acid, and the like, to form synthetic linear polyamides that are fiber-forming into fibers of excellent cold-draw characteristics. For example, the $C_8$ unsaturated diamines, produced by the embodiments described, and subjected to hydrogenation to the corresponding saturated $C_8$ diamines provides, upon being subjected to condensation polymerization conditions with an acid such as sebacic acid, adipic acid and the like, synthetic linear condensation polyamides that are fiber-forming to fibers of excellent cold-draw characteristics.

Although it is not intended that the invention be bound by any theory as to the particular reactions that occur in the processing of conjugated dienes to produce the diamino unsaturated derivatives thereof as embodied herein, it is believed that the following reactions occur when, for illustrative purposes, the reactants include butadiene and the free radical is an $NH_2$. radical such as formed by oxidation-reduction reaction of hydroxylamine hydrochloride and titanous chloride.

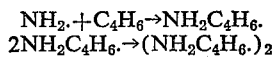

$$NH_2\cdot + C_4H_6 \rightarrow NH_2C_4H_6\cdot$$
$$2NH_2C_4H_6\cdot \rightarrow (NH_2C_4H_6)_2$$

While there are above disclosed but a limited number of embodiments of the process of the invention herein presented, it is possible to produce still other embodiments

What is claimed is:

1. A process which comprises preparing a substantially aqueous reaction mixture comprising (1) a diolefin from the group consisting of butadiene and isoprene and (2) a saturated aliphatic monohydric alcohol, said aqueous reaction mixture containing said alcohol in an amount by volume, of about two parts of alcohol per one part of water, and adding to said mixture (3) an aqueous solution of a metal salt from the group consisting of titanous chloride and stannous chloride and (4) hydroxylamine hydrochloride in a ratio of substantially one mole each of said metal salt and the hydroxylamine per from about two to about eight moles of the diolefin present in the reaction mixture, the said aqueous reaction mixture being maintained at an acid normality based on hydrochloric acid of at least 7 and there being produced an aqueous reaction phase containing a diamino unsaturated compound corresponding to the product of addition of two amino radicals to two units of said diolefin.

2. The process as defined in claim 1, wherein the diolefin is butadiene.

3. The process as defined in claim 1, wherein the diolefin is isoprene.

References Cited in the file of this patent

UNITED STATES PATENTS

| 2,567,109 | Howard | Sept. 4, 1951 |
| 2,683,140 | Howard | July 6, 1954 |

OTHER REFERENCES

David et al.: J. Chem. Soc., pp. 2563–2567, vol. III (1951). (Copy available in U.S. Pat. Office Lib.)